United States Patent Office 3,324,116
Patented June 6, 1967

3,324,116
CERTAIN PYRIDOBENZODIAZEPINE
DERIVATIVES
Karl J. Doebel and Heinz A. Pfenninger, Ossining, N.Y., assignors to Geigy Chemical Corporation, Greenburgh, N.Y., a corporation of Delaware
No Drawing. Filed June 23, 1965, Ser. No. 466,439
16 Claims. (Cl. 260—239.3)

This application is a continuation-in-part of copending application Ser. No. 333,732, filed Dec. 26, 1963, which in turn is a continuation-in-part of copending application 247,335, filed Dec. 26, 1962, both now abandoned.

This invention relates to new and useful pyridobenzodiazepine compounds and particularly to 1,2,3,11,12,12a-hexahydro[4H,6H]-pyrido[2,1-c] - [1,4]-benzodiazepine-12-ones as well as the pharmaceutically acceptable acid addition salts, the quaternary ammonium salts and the N-oxides thereof, which possess valuable pharmacological properties and are useful as pharmaceutical agents. The present invention pertains further to methods for producing such compounds and to novel intermediates useful in the preparation of such compounds.

More particularly, the compounds of this invention may be represented by the following structural formula:

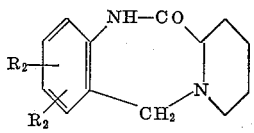

where $R_1$ and $R_2$ independently each stand for hydrogen, halogen (particularly chlorine and bromine), trifluoromethyl, cyano, lower alkyl or lower alkoxy or together are —O—$CH_2$—O— when attached to adjacent carbon atoms on the benzene ring.

The term "lower alkyl" as used herein per se and as included in the term "lower alkoxy" means saturated monovalent aliphatic radicals of the general formula —$C_mH_{2m+1}$ wherein $m$ designates an integer of less than six and is inclusive of both straight-chain and branched-chain radicals, such as methyl, ethyl, n-propyl, isopropyl, butyl, isobutyl, tertiary butyl, n-amyl, etc.

The compounds of this invention are produced by reacting lower alkylpipecolinates and appropriately substituted o-nitrobenzylhalides in such inert solvents as benzene, toluene, xylene, etc. in the presence of an excess of an acid binding agent, such as potassium carbonate, sodium carbonate, etc. The o-nitrobenzyl-pipecolinates thus obtained can be conveniently reduced with hydrogen in the presence of Raney nickel at atmospheric pressure and room temperature to yield the corresponding o-aminobenzyl-pipecolinates as intermediates. To prevent debenzylation in the hydrogenation step the hydrogenation must be stopped exactly after consumption of the theoretical amount of hydrogen. The intermediate o-aminobenzylpipecolinates can be saponified and simultaneously condensed to the desired pyridobenzodiazepine ring system by treating them with mineral acids such as hydrohalic (hydrochloric or hydrobromic) or sulfuric acids.

This synthesis may be graphically illustrated by the following equations:

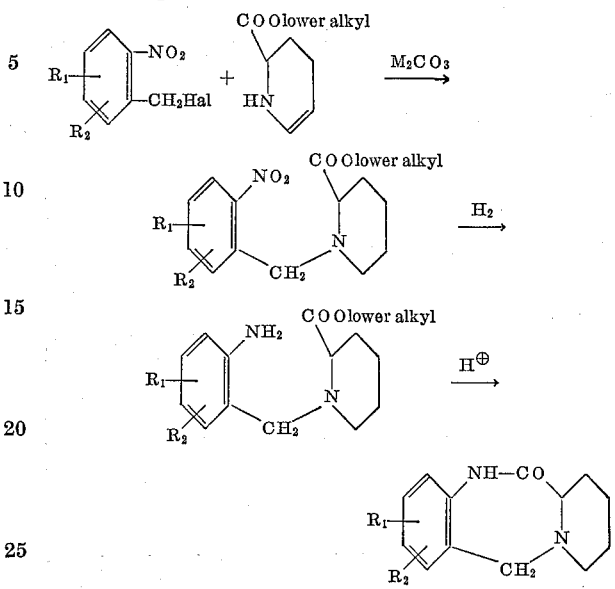

The symbols $R_1$ and $R_2$ have the significance ascribed to them hereinabove and Hal represents halogen, particularly chlorine or bromine and M stands for K or Na.

Alternatively, these intermediates can be saponified with base to the corresponding o-aminobenzylpipecolinic acids which are then subjected to ring closure conditions in acid media to form the desired compounds.

The present invention comprehends not only the above described pyridobenzodiazepine derivatives in their free base form, but it also includes pharmaceutically acceptable non-toxic acid addition salts thereof which may be formed from said derivatives in accordance with conventional practice, by using appropriate inorganic and organic acids, such as hydrohalic acids, especially hydrochloric and hydrobromic acids, sulfuric and phosphoric acids as well as acetic, lactic, succinic, malic, aconitic, phthalic and tartaric acids.

The quaternary ammonium salts of the subject compounds can be obtained by addition to the corresponding free bases of alkyl or aralkyl esters of inorganic acids or organic sulfonic acids, including such compounds as methyl chloride, methyl bromide, methyl iodide, ethyl bromide, propyl bromide, benzyl chloride, benzyl bromide, methyl sulfate, methyl benzenesulfonate, and methyl p-toluenesulfonate, giving the methochloride, methobromide, benzobromide, methosulfate, methobenzenesulfonate, and metho-p-toluene sulfonate salts respectively.

The compounds of this invention can also be converted to the corresponding N-oxides by using a large excess of hydrogen peroxide in ethanol.

Lower alkylpipecolinates and substituted o-nitrobenzylhalides employed as starting materials in the above-described synthesis are either commercially available or are obtainable from available chemicals in accordance with preparative methods described in the prior art (as indicated in greater detail in the sample hereinbelow).

As mentioned above, the subject compounds possess valuable pharmacological properties; they can be characterized as CNS depressant, anti-convulsant, muscle relaxant and hypertensive agents.

Merely by way of illustration, 8-chloro-1,2,3,11,12, 12a - hexahydro[4H,6H]pyrido[2,1 - c] - [1,4] - benzodiazepine-12-one decreases progressively the locomotor activity of mice when given in peroral doses of 50–500 mg./kg. The approximate $LD_{50}$ after i.p. administration is 250 mg./kg. This compound also causes short lasting hypertension in membutal anesthetized cats and possesses adrenolytic properties. 3 mg./kg. i.v. inhibits the patellar and flexor reflexes by 40–50%. While the extensor reflexes are inhibited by 100%, 10 mg./kg. i.v. inhibits the patellar reflexes by 40%, the flexor reflex by 90% and the extensor reflex by 100%.

When administered to gerbils in two vehicles, namely, as an aqueous solution of the hydrochloride salt and as a fine suspension in 2% colloidal cornstarch, per os and intraperitoneally, this compound produces a dose response pattern similar to phenobarbital, chlordiazepoxide and meprobamate. By both routes of administration in starch suspension it produces a dose response pattern similar to that of phenothiazines, that is, over a wide range of doses avoidance behavior is inhibited with no impairment of escape behavior. These results indicate that the compound can be given safely over a wide range of doses to produce a mild tranquilizing effect.

1,2,3,11,12,12a - hexahydro[4H,6H]pyrido[2,1 - c]-[1, 4]-benzodiazepine-12-one produces progressive loss of locomotor activity in mice in doses of 50–250 mg./kg. i.p. and at the higher doses a marked respiratory depression. In cats, low doses (2 mg./kg. i.v.) cause a short-lasting rise in blood pressure, whereas high doses (10 mg./kg. i.v.) cause a fall in blood pressure. This compound also has some analeptic action and inhibits gut mobility.

The compounds of this invention, their acid addition salts, quaternary ammonium salts and N-oxides as well as intermediates therefor, together with the modes of synthesis, may be more fully illustrated by the following examples. The scope of the invention is, however, not limited thereto. The temperatures therein given are in degrees centigrade.

For the following examples, the depicted nomenclature is used:

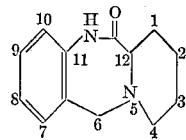

1,2,3,11,12,12a - hexahydro[4H,6H]-pyrido[2,1-c]-[1,4]-benzodiazepine-12-one.

As will be obvious to those skilled in the art, the new compounds of the instant invention can exist in optically-active isomeric forms. Such isomers are prepared by resolution of a starting material such as a pipecolinic acid with an optically-active acid such as tartaric acid and subsequent generation of the optically-active base. This base is then treated as described herein to obtain the optically-active final compounds of this invention. Furthermore, resolution of the racemic compounds contemplated by this invention can also be effected by such well-known methods as fractional crystallization and the optically-active compounds can be obtained in this manner. Resolution of the starting materials and their condensation followed by cyclization of the optically active intermediate and resolution of the final products will both be exemplified by detail hereinafter. All such isomers together with racemates are included within the scope of the present invention.

As is mentioned above, the o-aminobenzylpipecolinates used as intermediates can be prepared by reducing o-nitrobenzylpipecolinates with hydrogen in the presence of Raney nickel at atmospheric pressure and room temperature. However, since there is some tendency for debenzylation to occur in the hydrogenation step, it is necessary that the hydrogenation be stopped exactly after consumption of the theoretical amount of hydrogen. Now it has been found that this reduction of o-nitrobenzyl-pipecolinate can also be achieved by chemical methods, in particular with sodium hydrosulfite ($Na_2S_2O_4$) in aqueous solution. Such a process is outlined as follows, and is within the scope of the present invention. It is, in essence, a process for making a compound of the formula

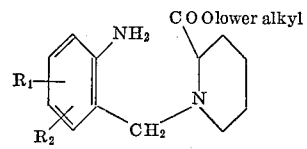

wherein $R_1$ and $R_2$ and each hydrogen, halogen, trifluoromethyl, cyano, lower alkyl or lower alkoxy or together are —O—$CH_2$—O— when attached to adjacent carbon atoms on the benzene ring which comprises reducing with about 4 molar equivalents of sodium hydrosulfite a compound of the formula

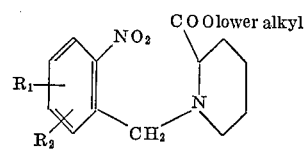

wherein $R_1$ and $R_2$ have the same meaning indicated above.

EXAMPLE 1

*1,2,3,11,12,12a-hexahydro[4H,6H]-pyrido-[2,1-c]-1,4-benzodiazepine-12-one*

(a) *Ethyl pipecolinate.*—200 g. of pipecolinic acid was dissolved in 1625 ml. of 5 N HCl. 8 g. of $PtO_2$ was added and the mixture was transferred to a 5 l. pressure flask and heated to 70°. This temperature was maintained and electronically controlled during the whole operation. The solution was shaken with hydrogen at a pressure of 50 p.s.i. The total uptake was 340 p.s.i. (3 hours). The flask was cooled to room temperature, hydrogen was replaced by nitrogen and the catalyst removed by filtration. Completeness of hydrogenation was controlled by U.V. measurements. The solution was then concentrated to dryness in vacuo and the crystalline pipecolinic acid hydrochloride dried by azeotropic distillation of benzene. 265 g. of pipecolinic acid hydrochloride were obtained; M.P. 265–266°. 100 g. of pipecolinic acid hydrochloride was dissolved in 1050 ml. of dry ethanol and 25 ml. of chlorosulfonic acid was added dropwise. The mixture was refluxed for 24 hours and the solvent removed in vacuo. The residue was dissolved in a small amount of water and the solution made alkaline with saturated $K_2CO_3$ solution at 0°. The alkaline solution was saturated with sodium chloride and exhaustively extracted with benzene and ether. The combined extracts were dried over sodium sulfate, filtered and the solvent removed in vacuo. The residue was distilled to yield 80.0 g. of the desired intermediate; B.P. 93–95°/14 mm.; $n_D^{24}=1.4550$. Only end-absorption in the U.V. spectrum was observed.

(b) *Ethyl N-(o-nitrobenzyl)pipecolinate.*—31.4 g. of ethyl pipecolinate was dissolved in 200 ml. of dry toluene. 32.0 g. of potassium carbonate was added and a solution of 34.3 g. of o-nitrobenzylchloride in 150 ml. of dry toluene was slowly dropped in while stirring. After the addition was complete, the mixture was refluxed for 12 hours. After cooling it was transferred to a beaker and an excess of 3 N HCl was added. When the potassium carbonate was decomposed both phases were transferred to a separatory funnel and the toluene phase was extracted with 3 N hydrochloric acid. The combined extracts were washed with ethyl acetate and alkalized with NaOH to pH 10. The precipitated oily material was taken up in chloroform and the latter washed with water, dried over sodium sulfate and the solvent was removed in vacuo. The residue was distilled to give 43 g. of the desired intermediate as a yellow oil; B.P. 150–152°/0.35 mm.; $n_D^{23} = 1.5266$.

Analysis.—For $C_{15}H_{20}N_2O_4$ (MW 292.35). Calcd: C, 61.65%; H, 6.89%; N, 9.57%. Found: C, 61.75%; H, 7.08%; N, 9.33%.

(c) *Ethyl N-(o-aminobenzyl)pipecolinate.*—33.0 g. of ethyl N-(o-nitrobenzyl)pipecolinate was dissolved in 500 ml. of ethanol and hydrogenated over Raney nickel at room temperature and atmospheric pressure. Uptake of hydrogen was 2350 ml. The catalyst was removed by filtration and the solvent removed in vacuo. The residue was distilled to yield 24.7 g. of the desired intermediate; B.P. 146–147°/0.5 mm.; $n_D^{23} = 1.5392$.

(d) *1,2,3,11,12,12a - hexahydro[4H,6H]-pyrido[2,1-c] 1,4-benzodiazepine-12-one.*—24 g. of ethyl N-(o-aminobenzyl)pipecolinate was dissolved in 300 ml. of 3 N CHl and refluxed for 5 hours. The resulting yellow solution was cooled, filtered and alkalized to a pH of 10. The crystalline precipitate was collected on a Buchner-funnel, washed with water and recrystallized from 2B-ethanol. Yield of the desired compounds was 70%; M.P. was 182–183°.

Analysis.—For $C_{13}H_{16}N_2O$ (MW 216.29). Calcd: C, 72.2%; H, 7.46%; N, 12.92%. Found: C, 72.13%; H, 7.66%; N, 12.83%.

The hydrochloride was obtained in crystalline form by treating the free base with excess ethanolic HCl, removing the solvent in vacuo and recrystallizing the residue from either ethanol or 5 N HCl. It melted at above 250°.

EXAMPLE 2

*5-methyl-1,2,3,11,12,12a-hexahydro-[4H,6H]-pyrido-[2,1-c]-[1,4]-benzodiazepine-12-one iodide*

5 g. of 1,2,3,11,12,12a-hexahydro-[4H,6H]-pyrido-[2,1-c]-[1,4]-benzodiazepine-12-one were dissolved in 150 ml. of anhydrous toluene and 10 ml. of methyl iodide were added. The solution immediately became cloudy and gradually a precepitate formed. The mixture was kept for 4 hours at 80° whereupon the precipitate was filtered off under suction and recrystallized several times from methylethylketone. The quaternary salt was obtained in a yield of 85%; it melts at 224–225° with decomposition.

EXAMPLE 3

*8-chloro-1,2,3,11,12,12a-hexahydro-[4H,6H]-pyrido-[2,1-c]-[1,4]-benzodiazepine-12-one*

(a) *Ethyl N-(2 - nitro-5-chlorobenzyl)pipecolinate.*—33.3 g. of ethyl pipecolinate was dissolved in 200 ml. of dry toluene, 34 g. of potassium carbonate was added and a solution of 44.54 g. of 2-nitro-5-chlorobenzylchloride [synthesized via the procedure described by Eichengrun and Einhorn, A. 262, 133 (1891) and Fieser and Berliner, JACS 74, (1952)] in 300 ml. of dry toluene dropped in while stirring. After the addition was complete the mixture was refluxed for 12 hours. After cooling the mixture was acidified and exhaustively extracted with 3 N HCl. The combined acid extracts were washed with ethyl acetate and then made strongly alkaline. The precipitated oil was extracted with ether, the latter washed with water, dried over sodium sulfate and removed in vacuo. The residue was distilled in vacuo to yield 45.8 g. (66% theory) of the desired intermediate as a yellow viscous oil; B.P. 153–154°/0.1 mm.

Analysis.—For $C_{15}H_{19}ClN_2O_4$ (MW 326.79). Calcd: C, 55.2%; H, 5.86%; Cl, 10.84%; N, 8.58%. Found: C, 55.20%; H, 6.00%; Cl, 11.03%; N, 8.59%.

(b) *Ethyl N-(2-amino-5-chlorobenzyl)pipecolinate.*—7.5 g. ethyl N-(2-nitro-5-chlorobenzyl)pipecolinate was dissolved in 100 ml. of ethanol and hydrogenated at room temperature and atm. pressure over Raney Nickel. Uptake of hydrogen was 1670 ml. The catalyst was then removed by filtration and the filtrate evaporated to dryness in vacuo. The residual oil was distilled to yield 5.1 g. of the desired intermediate as oil; B.P. 154°/0.3 mm.

Analysis.—For $C_{15}H_{21}ClN_2O_2$ (MW 296.80). Calcd: C, 60.80%; H, 7.12%; Cl, 11.93%; N, 9.45%. Found: C, 60.53%; H, 7.27%; Cl, 11.89%; N, 9.62%.

(c) *8-chloro-1,2,3,11,12,12a-hexahydro[4H,6H]pyrido-[2,1-c]1,4-benzodiazepine-12-one.*—20.0 g. of ethyl N-(2-amino-5-chlorobenzyl)pipecolinate was refluxed with 350 ml. of 3 N HCl for 5 hours. After cooling the solution was alkalized to pH 10 and then extracted exhaustively with $CHCl_3$. The combined $CHCl_3$ extracts were washed with water, dried over sodium sulfate and the solvent removed in vacuo. The residue weighed 16.32 g. and was a white crystalline solid. It could be easily recrystallized from 2B ethanol. Yield of the desired compound was 14 g.; M.P. 224–225°.

Analysis.—For $C_{13}H_{15}ClN_2O$ (MW 250.72). Calcd: C, 62.35%; H, 6.03%; Cl, 14.13%; N, 11.17%. Found: C, 62.08%; H, 6.29%; Cl, 14.30%; N, 11.21%.

EXAMPLE 4

*8-chloro-5-methyl-1,2,3,11,12,12a-hexahydro[4H,6H]-pyrido[2,1-c]-[1,4]-benzodiazepine-12-one iodide*

35 g. of 8-chloro-1,2,3,11,12,12a-hexahydro[4H,6H]-pyrido[2,1-c]-[1,4]-benzodiazepine-12-one was dissolved in 100 ml. of dry toluene. 10 ml. of methyliodide was added and the mixture was refluxed for 6 hours and cooled. The precipitated yellow crystals were filtered off, washed with ether and recrystallized 5 times from methylethyl-ketone. The desired quaternary salt melted at 246–248° (dec.).

Analysis.—For $C_{14}H_{18}ClIN_2O$ (MW 392.67). Calcd: C, 42.8%; H, 4.62%; I, 32.3%; N, 7.13%. Found: C, 43.07%; H, 4.54%; I, 32.53%; N, 7.23%.

EXAMPLE 5

*8-chloro-1,2,3,11,12,12a-hexahydro[4H,6H]pyrido-[2,1-c]-[1,4]-benzodiazepine-12-one-N-oxide*

1.0 g. of 8-chloro-1,2,3,11,12,12a-hexahydro[4H,6H]-[2,1-c]-[1,4]-benzodiazepine-12-one was suspended in 10 ml. of ethanol and 1.8 ml. of 30% hydrogen peroxide was added. The mixture was refluxed for 12 hours. Excess hydrogen peroxide was destroyed with platinum wire and the solution was evaporated to dryness in vacuo. The residue was crystallized from ethyl acetate (it can be recrystallized from ethanol). The desired compound melted at 162–163° (dec.).

EXAMPLE 6

*9-cyano-1,2,3,11,12,12a-hexahydro[4H,6H]pyrido-[2,1-c]-[1,4]-benzodiazepine-12-one*

(a) *Ethyl N-(2-nitro-4-cyanobenzyl)pipecolinate.*—6.5 g. of nitro-4-cyanobenzylbromide [prepared by the method described in Ber. 27, 2169 (1894)] was dissolved in 100 ml. of dry toluene and 27 g. of potassium carbonate was added. A solution of 4.06 g. of ethyl pipecolinate in 100 ml. of dry toluene was dropped into the first prepared boiling mixture with stirring and was refluxed for 15 hours. After cooling to room temperature the reaction mixture was filtered and the residue was washed with ethyl acetate and the combined filtrates were transferred to a separatory funnel and first washed with water and then extracted exhaustively with 2 N HCl. The combined extracts were then alkalized with potassium carbonate and the precipitated oil taken up in ethyl acetate. After drying over sodium sulfate the solvent was removed in vacuo and the oily residue distilled in vacuo. Yield of desired intermediate as yellow oil was 4.0 g.; B.P. 160°/0.005 mm.

(b) *Ethyl N-(2-amino-4-cyanobenzyl)pipecolinate.*—8.9 g. of ethyl N-(2-nitro-4-cyanobenzyl)pipecolinate was dissolved in 200 ml. of ethanol and hydrogenated at room temperature and atm. pressure over Raney Nickel. Uptake of hydrogen was 2060 ml. The catalyst was filtered off and the filtrate concentrated to dryness in vacuo. The residue weighed 8.5 g. and crystallized; M.P. 100–106°.

(c) *9-cyano-1,2,3,11,12,12a-hexahydro[4H,6H]pyrido-[2,1-c]-[1,4]-benzodiazepine-12-one.*—7.5 g. of ethyl N-(2-amino-4-cyanobenzyl)pipecolinate was refluxed with 100 ml. of 3 N HCl for 2 hours. After cooling to room temperature the solution was diluted with 350 ml. of water, treated with charcoal and filtered. The filtrate was alkalized with potassium carbonate and the resulting solution extracted exhaustively with ethyl acetate. The combined extracts were dried over sodium sulfate. The solvent was removed in vacuo and the residue (2.3 g.) sublimed in high vacuo. The desired compound melted at 134°.

EXAMPLE 7

*9-methoxy-1,2,3,11,12,12a-hexahydro[4H,6H]pyrido-[2,1-c]-[1,4]benzodiazepine-12-one*

(a) *Ethyl N-(2-nitro-4-methoxybenzyl)pipecolinate.*— 8 g. of 2-nitro-4-methoxybenzylchloride was dissolved in 200 ml. of dry toluene, 20.0 g. of potassium carbonate was added and a solution of 6.3 g. of ethyl pipecolinate in 20 ml. of dry toluene was dropped in at once. The mixture was stirred and refluxed for 26 hours. After cooling it was filtered and washed with ethyl acetate. The combined filtrates were exhaustively extracted with 3 N HCl and the combined acid extracts were washed with ether and alkalized with 3 N sodium hydroxide. The precipitated oil was taken up in ether and the latter dried over sodium sulfate and the solvent removed in vacuo. The residue was distilled to yield a viscose yellow oil, 6.4 g., B.P. 165–167°/0.2 mm., as intermediate.

*Analysis.*—For $C_{16}H_{22}N_2O_5$ (MW 322.37). Calcd: C, 59.61%; H, 6.89%; N, 8.69%. Found: C, 59.91%; H, 6.93%; N, 8.80%.

(b) *Ethyl N-(2-amino-4-methoxybenzyl)pipecolinate.*—6.45 g. ethyl N-(2-nitro-4-methoxybenzyl)pipecolinate was dissolved in 150 ml. of absolute ethanol and hydrogenated over Raney nickel at room temperature and atm. pressure. The calculated and observed uptake was 1450 ml. of hydrogen at 23°/756 mm. Hg. The catalyst was removed by filtration and the filtrate evaporated to dryness. The residual oil was distilled to yield 4.0 g., B.P. 163–165°/0.5 mm., of the desired intermediate.

(c) *9-methoxy-1,2,3,11,12,12a-hexahydro[4H,6H]-pyrido[2,1-c]-[1,4]-benzodiazepine-12-one.*—4 g. of ethyl N-(2-amino-4-methoxybenzyl)pipecolinate was refluxed for 14 hours in 100 ml. of 3 N HCl. After cooling the solution was alkalized with 3 N sodium hydroxide and thoroughly extracted with chloroform. The combined chloroform extracts were washed with water, dried over sodium sulfate and the solvent evaporated in vacuo. The residual solid was recrystallized from n-butanol; M.P. 205–207°.

EXAMPLE 8

*9-methyl-1,2,3,11,12,12a-hexahydro[4H,6H]pyrido-[2,1-c]-[1,4]-benzodiazepine-12-one*

10 g. of ethyl N-(2-amino-4-methylbenzyl)pipecolinate (M.P. 66–67°) in 200 ml. of 3 N hydrochloric acid was refluxed for 5 hours. After cooling, the solution was made alkaline, the crystalline precipitate formed was filtered off, washed with water and recrystallized from ethanol. The 9-methyl-1,2,3,11,12,12a-hexahydro[4H,6H]pyrido[2,1-c]-[1,4]-benzodiazepine-12-one so obtained melts at 213–232°: yield 40%.

EXAMPLE 9

*8,9-dimethoxy-1,2,3,11,12,12a-hexahydro[4H,6H]-pyrido[2,1-c]-[1,4]-benzodiazepine-12-one*

16.25 g. of ethyl N-(4,5-dimethoxy-2-aminobenzyl) pipecolinate were refluxed for 16 hours in a mixture of 170 ml. of 5 N sodium hydroxide solution and 170 ml. of ethanol. The ethanol was then completely removed under reduced pressure and water was added to the residue until a clear solution was obtained, whereupon the mixture was made acid with sulphuric acid (1:1). After standing for 24 hours at room temperature, the solution was treated with animal charcoal, filtered and evaporated to dryness. 3 g. (21.6%) of crude product were obtained in this way. Recrystallized from ethanol, pure 8,9-dimethoxy-1,2,3,11,12a - hexahydro[4H,6H]pyrido[2,1 - c] - [1,4] - benzodiazepine-12-one were obtained. It melts at 203–204°.

The following compounds were obtained by processes analogous to those described in Examples 1, 3, 6, 7 and 8.

| Example | Compound | M.P.,° |
|---|---|---|
| 10 | 9-trifluoromethyl-1,2,3,11,12,12a-hexahydro[4H,6H]pyrido[2,1-c]-[1,4]-benzodiazepine-12-one. | 185–186 |
| 11 | 9-chloro-1,2,3,11,12,12a-hexahydro-[4H,6H]pyrido[2,1-c]-[1,4]-benzodiazepine-12 one. | 182–183 |
| 12 | 8,9-dimethyl-1,2,3,11,12,12a-hexahydro[4H,6H]pyrido[2,1-c]-[1,4]-benzodiazepine-12-one. | 229–230 |
| 13 | 8,9-dichloro-1,2,3,11,12,12a-hexahydro-[4H,6H]pyrido[2,1-c]-[1,4]-benzodiazepine-12-one. | 199–200 |
| 14 | 8,9-methylenedioxy-1,2,3,11,12,12a-hexahydro[4H,6H]pyrido[2,1-c]-[1,4]-benzodiazepine-12-one. | 265–266 |

EXAMPLE 15

*D-(—)-8-chloro-1,2,3,11,12,12a-hexahydro[4H,6H]-pyrido-[2,1-c]-[1,4]-benzodiazepine-12-one*

(a) *D-(+)-ethylpipecolinate.*—100 g. of racemic mixture of pipecolinic acid was resolved into the diestereoisomeric pair as the (+)-pipecolinium-(+)-tartrate and the (—)-pipecolinium-(+)-tartrate according to the procedure of F. Mende [Ber., 29, 2887 (1896)]. The 73.3 g. of (+)-pipecolinium-(+)-tartrate ($[\alpha]_D^{28°}$ +19.5°, c.=2.75, $H_2O$) was slurried in 900 ml. absolute ethanol and the mixture cooled to 0°. The mixture was then saturated with hydrogen chloride (dried through $H_2SO_4$) keeping the temperature at near 0° by ice bath cooling. After saturation, the solution was allowed to warm to room temperature overnight and the solvent removed at reduced pressure.

The residual solid was dissolved in the minimum amount of ice water, and the aqueous solution extracted several times with small portions of ether which were discarded. The aqueous extract was cooled and rendered alkaline with saturated potassium carbonate solution and extracted several times with ether. The combined ether extracts were dried over $Na_2SO_4$ and the solvent removed at reduced pressure. The residual oil was distilled twice at water aspirator pressure and the fraction boiling at 98° at 15 mm. Hg was collected (second distillation) $[\alpha]_D^{27°}$ +18.6° (c.=4.133, DMSO). There were 6.4 g.; $n^{25°}$=1.4540 of the D-(+)-ethylpipecolinate.

(b) *D-(—)-ethyl-N-(2-nitro-5-chlorobenzyl) - pipecolinate.*—To a well stirred mixture of 15.3 g. anhydrous $K_2CO_3$, 15.0 g. D - (+) - ethylpipecolinate ($[\alpha]_D^{27°}$ +18.6°) and 90 ml. anhydrous toluene was added dropwise to a solution of 20.1 g. 2-nitro-5-chlorobenzylchloride in 80 ml. dry toluene at 50°. After addition, the mixture was stirred and heated under reflux in an oil bath for 18 hours. The reaction mixture was cooled, transferred to a large beaker and cautiously acidified with 3 N hydrochloric acid solution with cooling. The organic phase was separated from the aqueous acid phase and extracted three times more with 3 N hydrochloric acid solution. The combined aqueous phases were cooled and rendered alkaline with 10 N NaOH solution keeping the temperature near that of the ice bath. The cooled alkaline mixture was exhaustively extracted with ether and the combined ether extracts washed with ice water and dried ($Na_2SO_4$). Evaporation of the ether at reduced pressure yielded 19.8 g. of a yellow viscous oil. Distillation of this oil in high vacuum yielded as the main fraction D-(—)-ethyl-N-

(2-nitro-5-chlorobenzyl)-pipecolinate (16.76 g.; B.P. 100–103°/0.003 mm. Hg; I.R. in CHCl₃ consistent with that of the d,l mixture, $[\alpha]_D^{28°}$ −52.2°, (c=2.98 in dimethylsulfoxide).

(c) *D-(+) - ethyl-N-(2-amino-5-chlorobenzyl)-pipecolinate.*—The D - (−)-ethyl-N-(2-nitro-5-chlorobenzyl)-pipecolinate (16.5 g.) was dissolved in 150 ml. 2B ethanol and hydrogenated over Raney nickel. The catalyst was removed by filtration and the filtrate evaporated at reduced pressure. The crude residual oil had a $[\alpha]_D^{27°}$ +83.6°, (c.=2.885 in dimethylsulfoxide). Distillation of a 3.0 g. sample in high vacuum yielded the D-(+)-ethyl-N-(2-amino-5-chlorobenzyl-pipecolinate, B.P. 101–103°/0.001 mm. Hg.; I.R. in CHCl₃ consistent with the d,l-mixture (GPA 1165), $n_D^{25°}$ 1.5485, (GPA 1165, $n_D^{24°}$ 1.5489, $[\alpha]_D^{26°}$ +85.5° (c.=17.445 in dimethylsulfoxide.

(d) *D - (−) - 8 - chloro - 1,2,3,11,12,12a-hexahydro-[4H,6H] - pyrido-[2,1-c]-[1,4]-benzodiazepine-12-one.*— A solution of 13.0 g. D-(+)-ethyl-N-(2-amino-5-chlorobenzyl)-pipecolinate ($[\alpha]_D^{28°}$ +83.6°) in 195 ml. 3 N hydrochloric acid solution was heated under reflux for 14 hours. The reaction was cooled in ice, cautiously rendered alkaline with 10 N NaOH while cooling and the resulting mixture taken up in ether-n-butanol (3:1) (500 ml.) and the organic phase washed with small portions of water to neutrality. The organic extract was dried (Na₂SO₄) and the solvents removed at reduced pressure. The compound was recrystallized once from ethanol and once from acetone to yield D-(−)-8-chloro-1,2,3,11,12,12a - hexahydro - [4H,6H] - pyrido - [2,1-c]-[1,4]-benzodiazepine-12-one, M.P. 169–170°, infra red consistent with the d,l-mixture (GPA 1032), $[\alpha]_D^{27°}$ −332°, (c.=1.575 in dimethylsulfoxide).

EXAMPLE 16

*L-(+)-8-chloro-1,2,3,11,12,12a-hexahydro[4H,6H]-pyrido-[2,1-c]-[1,4]-benzodiazepine-12-one*

A solution of 16.87 g. L-(−)-ethyl-N-(2-amino-5-chlorobenzyl-pipecolinate ($[\alpha]_D^{26°}$ −89.5°) in 250 ml. 3 N hydrochloric acid solution was heated under reflux for 22 hours. The reaction was cooled in ice, cautiously rendered alkaline with 10 N NaOH solution with cooling and the precipitated compound collected in a Buchner and washed well with water. The product was recrystallized twice from acetone after treating with charcoal. The crystals were dried in a vacuum oven at 60°. There were 8.5 g. having a M.P. of 169–172° (capillary) and an $[\alpha]_D^{28°}$ +359°, (c.=2.58, DMSO). The infrared spectrum was consistent with those of the racemic mixture and the levo form.

EXAMPLE 17

*Resolution of d,l-8-chloro-1,2,3,11,12,12a-hexahydro-[4H,6H]pyrido[2,1-c]-[1,4]-benzodiazepine-12-one*

(a) *l-Isomer.*—12.5 g. d,l - 8 - chloro-1,2,3,11,12,12a-hexahydro[4H,6H]pyrido - [2,1-c]-[1,4]-benzodiazepine-12-one and 17.9 g. dibenzoyl-l-tartaric acid were dissolved in a hot mixture of 200 ml. isopropanol and 300 ml. water. Upon cooling one of the diastereoisomeric salts crystallized out. Yield 19.5 g.; M.P. 139–140° (dec.). It was recrystallized from ethanol-water to the M.P. 145–47° (dec.). Yield 14.5 g. (95.5%).

10 g. of this salt was decomposed at room temperature wtih 1 N sodium hydroxide solution and the liberated base extracted with chloroform. The organic extract was dried and the residue that remained after removal of the solvent crystallized and recrystallized from ethanol to the M.P. 176.5–177° C. Yield 2.5 g. (58% from the racemate) $[\alpha]_D^{27°}$=−384° (c.=2.135; DSMO; 10 mm.).

(b) *d-Isomer.*—12.5 g. d,l - 8 - chloro-1,2,3,11,12,12a-hexahydro[4H,6H]pyrido - [2,1-c]-[1,4]-benzodiazepine-12-one and 17.9 g. dibenzoyl-d-tartaric acid were dissolved in a hot mixture of 200 ml. isopropanol and 300 ml. water. Upon cooling one of the diestereoisomeric salts crystallized out. Yield 18.0 g.; M.P. 137–139° (dec.). It was recrystallized from ethanol-water to the M.P. 144–47° (dec.). Yield 13.2 g. (87%). 10 g. of this salt was decomposed at room temperature with 1 N sodium hydroxide solution and the liberated base extracted with chloroform. The organic extract was dried and the residue that remain after removal of the solvent crystallized and recrystallized from ethanol to the M.P. 175–176° C. Yield 2.3 g. (53.5% from the racemate) $[\alpha]_D^{27°}$=+372° (c.=1.95; DMSO; 10 mm.).

EXAMPLE 18

*Ethyl-N-(2-amino-5-chlorobenzyl)-pipecolinate*

Ethyl-N-(2-amino-5-chlorobenzyl)-pipecolinate, 3,862 g. (10.7 moles), is charged into a 20 gallon resin flask fitted with a stirrer, thermometer, nitrogen inlet and reflux condenser. A solution of 7,700 g., 44.5 moles, of sodium hydrosulfite in 36,000 mls. of water is added and the mixture is stirred under nitrogen for 1½ hours. A very slow exotherm to 45° takes place and at this temperature, the exotherm becomes somewhat more rapid and is not allowed to exceed a reaction temperature of 51° (an ice-water bath easily controls the exotherm). The exotherm ceases almost at once; cooling is removed; and the reaction mixture is stirred for a further 1½ hours. The light oily mixture is cooled to 10°; made basic to pH 12–14 with 8,000 mls. of 25% (weight/volume) sodium hydroxide solution, and extracted three times with 8,000 mls. of benzene. The procedure described is repeated. All benzene extracts from both preparations are combined and dried over 4,000 g. of magnesium sulphate. The magnesium sulfate is filtered off and washed twice with 2,000 mls. of benzene. The filtrate and washes are combined and stripped at a bath temperature of 50° C. and at a pressure of 5 mm. Hg. This product is eminently suitable for conversion to 8-chloro-1,2,3,11,12,12a-hexahydro[4H,6H]pyrido-[1,4]-benzodiazepine-12-one by the procedure of step (c) of Example 3.

What is claimed is:
1. A compound selected from the group consisting of pyridobenzodiazepines of the formula

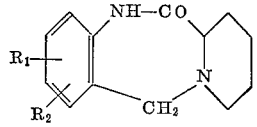

wherein $R_1$ and $R_2$ each are members selected from the group consisting of hydrogen, halogen, trifluoromethyl, cyano, lower alkyl and lower alkoxy, or together are —O—CH₂—O— when attached to adjacent carbon atoms on the benzene ring,
pharmaceutically acceptable acid addition salts, quaternary lower alkyl and phenyl lower alkyl ammonium salts and N-oxides thereof.

2. 1,2,3,11,12,12a - hexahydro[4H,6H]pyrido[2,1-c]-[1,4]-benzodiazepine-12-one.

3. 5 - methyl - 1,2,3,11,12,12a-hexahydro[4H,6H]pyrido-[2,1-c]-[1,4]-benzodiazepine-12-one iodide.

4. 8 - chloro - 1,2,3,11,12,12a-hexahydro[4H,6H]pyrido-[2,1-c]-[1,4]-benzodiazepine-12-one.

5. 8 - chloro - 5 - methyl-1,2,3,11,12,12a-hexahydro-[4H,6H]pyrido - [2,1 - c]-[1,4]-benzodiazepine-12-one iodide.

6. 8 - chloro - 1,2,3,11,12,12a-hexahydro[4H,6H]pyrido-[2,1-c]-[1,4]-benzodiazepine-12-one-N-oxide.

7. 9 - methoxy - 1,2,3,11,12,12a-hexahydro[4H,6H]pyrido-[2,1-c]-[1,4]-benzodiazepine-12-one.

8. 9 - methyl - 1,2,3,11,12,12a-hexahydro[4H,6H]pyrido-[2,1-c]-[1,4]-benzodiazepine-12-one.

9. 8,9 - dimethoxy - 1,2,3,11,12,12a-hexahydro[4H,6H]-pyrido[2,1-c]-[1,4]-benzodiazepine-12-one.

10. 9 - trifluoromethyl - 1,2,3,11,12,12a - hexahydro-[4H,6H]pyrido[2,1-c]-[1,4]-benzodiazepine-12-one.

11. 9 - chloro - 1,2,3,11,12,12a - hexahydro[4H,6H]pyrido-[2,1-c]-[1,4]-benzodiazepine-12-one.

12. 8,9 - dimethyl - 1,2,3,11,12,12a - hexahydro[4H,6H]pyrido[2,1-c]-[1,4]-benzodiazepine-12-one.

13. 8,9 - dichloro - 1,2,3,11,12,12a - hexahydro[4H,6H]pyrido[2,1-c]-[1,4]-benzodiazepine-12-one.

14. 8,9 - methylenedioxy - 1,2,3,11,12,12a - hexahydro-[4H,6H]pyrido[2,1-c]-[1,4]-benzodiazepine-12-one.

15. A process for making a compound of the formula:

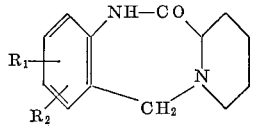

wherein $R_1$ and $R_2$ independently are each members selected from the group consisting of hydrogen, halogen, trifluoromethyl, cyano, lower alkyl and lower alkoxy or together are —O—$CH_2$—O— when attached to adjacent carbon atoms on the benzene ring, which comprises refluxing with mineral acid a compound of the formula

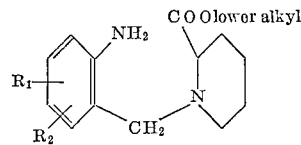

wherein $R_1$ and $R_2$ have the same meaning indicated above.

16. A process according to claim 15 wherein said mineral acid is hydrochloric acid.

No references cited.

WALTER A. MODANCE, *Primary Examiner.*

ROBERT T. BOND, *Assistant Examiner.*

UNITED STATES PATENT OFFICE
CERTIFICATE OF CORRECTION

Patent No. 3,324,116            June 6, 1967

Karl J. Doebel et al.

It is hereby certified that error appears in the above numbered patent requiring correction and that the said Letters Patent should read as corrected below.

Column 2, lines 3 to 7, the second formula should appear as shown below instead of as in the patent:

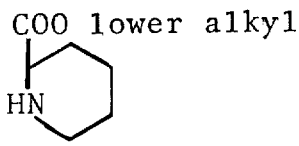

column 7, line 7, for "7.5" read -- 7.3 --; line 68, for "213-232°:" read -- 231-232°; --; column 8, line 53, for "6.4" read -- 46.4 --; line 54, for $n^{25°}=1.4540$          read          $n_D^{25°}=1.4540$ column 9, line 71, for "DSMO" read -- DMSO --.

Signed and sealed this 7th day of January 1969.

(SEAL)
Attest:

EDWARD M. FLETCHER, JR.          EDWARD J. BRENNER
Attesting Officer                Commissioner of Patents